(12) United States Patent
Miller et al.

(10) Patent No.: US 10,405,517 B2
(45) Date of Patent: Sep. 10, 2019

(54) CATTLE CHUTE LAMP

(71) Applicant: Weaver Leather, LLC, Mt. Hope, OH (US)

(72) Inventors: Joseph J. Miller, Millersburg, OH (US); Steven K. Sindlinger, Apple Creek, OH (US)

(73) Assignee: Weaver Leather, LLC, Mt. Hope, OH (US)

( * ) Notice: Subject to any disclaimer, the term of this patent is extended or adjusted under 35 U.S.C. 154(b) by 49 days.

(21) Appl. No.: 15/449,364

(22) Filed: Mar. 3, 2017

(65) Prior Publication Data

US 2018/0252397 A1    Sep. 6, 2018

(51) Int. Cl.

| | |
|---|---|
| *A01K 1/06* | (2006.01) |
| *F21V 21/08* | (2006.01) |
| *A01K 1/00* | (2006.01) |
| *A01K 13/00* | (2006.01) |
| *A01K 15/04* | (2006.01) |
| *F21V 21/30* | (2006.01) |
| *F21Y 115/10* | (2016.01) |
| *F21W 131/402* | (2006.01) |

(52) U.S. Cl.
CPC .......... *A01K 1/0613* (2013.01); *A01K 1/0011* (2013.01); *A01K 13/00* (2013.01); *A01K 15/04* (2013.01); *F21V 21/08* (2013.01); *F21V 21/30* (2013.01); *F21W 2131/402* (2013.01); *F21Y 2115/10* (2016.08)

(58) Field of Classification Search
CPC ........ F21V 23/001; F21V 21/08; F21V 21/26; F21V 21/14; A01K 1/0011; A01K 13/00; A01K 15/04; A01K 1/0613
USPC ....... 362/152, 217.11–217.17, 249.07–249.1, 362/285, 287; 119/516, 517
See application file for complete search history.

(56) References Cited

U.S. PATENT DOCUMENTS

| | | | | |
|---|---|---|---|---|
| 4,803,606 A | * | 2/1989 | Rotter | F21S 6/003 362/220 |
| 9,642,336 B2 | * | 5/2017 | Burroughs | A01K 13/00 |
| 2017/0299161 A1 | * | 10/2017 | Boorom | F21V 21/26 |

* cited by examiner

*Primary Examiner* — Sean P Gramling
(74) *Attorney, Agent, or Firm* — McDonald Hopkins LLC (57) ABSTRACT

A lamp assembly selectively engageable with a frame member of a cattle chute without using tools. The frame member is received into a channel of a mounting assembly of the lamp assembly. A locking mechanism is pivoted to lock the mounting assembly around the frame member. The orientation of the lamp is adjusted by pivoting a support assembly connected to the lamp into a desired position relative to the mounting assembly and engaging locking pins to retain the support assembly in the selected orientation. The lamp includes a plurality of LEDs that are actuated to shine light into the cattle chute. The lamp assembly is removed from the chute frame member by pivoting the locking mechanism back to an unlocked position and then moving the mounting assembly in a direction that causes the frame member to exit the channel.

7 Claims, 10 Drawing Sheets

CATTLE CHUTE LAMP

BACKGROUND

Technical Field

The current invention relates generally to fleging equipment. More particularly, the invention is directed to cattle chutes. Specifically, the current disclosure relates to a lamp that is mountable on a frame of a cattle chute to provide directed lighting into the chute.

Background Information

Cattle are frequently placed into cattle chutes to isolate them for a number of reasons such as during an examination or grooming process. At agricultural shows an animal will be placed into a cattle chute so that owners can examine or groom the animal prior to the show event. If the cattle chute is in a location such as a barn, the owner may not easily be able to examine and groom the animal properly because of the low level of light. It is therefore common for an owner to use multiple lights, including free-standing lights. These lights have to be constantly moved along with the electrical cords as the owner moves around the animal as part of the examination and grooming process. These lights also take up work space the owner needs during the process.

SUMMARY

The present disclosure is directed to a lamp assembly that is selectively attachable to a cattle chute and is selectively movable to direct light in a number of different directions. The lamp assembly allows the user to illuminate an animal in the chute so that he or she may more readily examine and groom the animal and use both hands while doing so.

A lamp assembly selectively engageable with a frame member of a cattle chute without using tools is disclosed herein. The frame member is received into a channel of a mounting assembly of the lamp assembly. A locking mechanism is pivoted to lock the mounting assembly around the frame member. The orientation of the lamp is adjusted by pivoting a support assembly connected to the lamp into a desired position relative to the mounting assembly and engaging locking pins to retain the support assembly in the selected orientation. The lamp includes a plurality of LEDs that are actuated to shine light into the cattle chute. The lamp assembly is removed from the chute frame member by pivoting the locking mechanism back to an unlocked position and then moving the mounting assembly in a direction that causes the frame member to exit the channel.

In one aspect, the current invention may comprise a lamp assembly comprising a mounting assembly adapted to secure the lamp assembly to a support; a support assembly operatively engaged with the mounting assembly; and a lamp engaged with the support assembly; wherein the support assembly is adjustable to vary an angle of the lamp relative to the mounting assembly.

In another aspect, the current invention may comprise in combination: a cattle chute including a first frame member; and a lamp assembly that is mountable onto the first frame member; said lamp assembly comprising: a mounting assembly that is selectively engageable with the first frame member; a support assembly operatively engaged with the mounting assembly; and a lamp engaged with the support assembly; wherein the support assembly is adjustable to vary an angle of the lamp relative to the mounting assembly and thereby to vary an angle light emitted from the lamp into the cattle chute.

In yet another aspect, the invention may comprise a method of illuminating an animal in a cattle chute: comprising: engaging a first frame member of the cattle chute in a mounting assembly of a lamp assembly; adjusting an orientation of a lamp on the lamp assembly relative to the mounting assembly; and illuminating an animal in an interior of the cattle chute with light emitted by the lamp.

The step of engaging the first frame member comprise inserting the first frame member into a channel of a channel member on the mounting assembly; and a locking mechanism on the mounting assembly from an unlocked position to a locked position. The step of moving the locking mechanism further comprises pivoting the locking mechanism relative to the channel member. The step of moving the locking mechanism further comprises moving a leg on the locking mechanism from a first position where the leg does not extend across an opening to the channel to a second position where the leg does extend across the opening to the channel; and preventing removal of the first frame member from the channel with the leg that extends across the opening to the channel. The step of adjusting the lamp comprises selecting an angle of illumination of the lamp; pivoting a pair of lamp brackets engaged with the lamp relative to a pair of adjustment plates; aligning one of a plurality of holes on each of the lamp brackets with an aperture defined in an associated one of the pair of adjustment plates; and inserting a locking pin through each aligned aperture and the one of the plurality of holes.

The method may further comprise adjusting the angle of the lamp relative to the mounting assembly by pivoting the lamp brackets relative to the pair of adjustment plates; aligning a second one of the plurality of holes on each of the lamp brackets with the aperture in the pair of adjustment plates; and inserting each locking pin through the aligned aperture and the second one of the plurality of holes. The method may further comprise actuating a plurality of LEDs provided on the lamp; and emitting light from the LEDs into the interior of the cattle chute.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
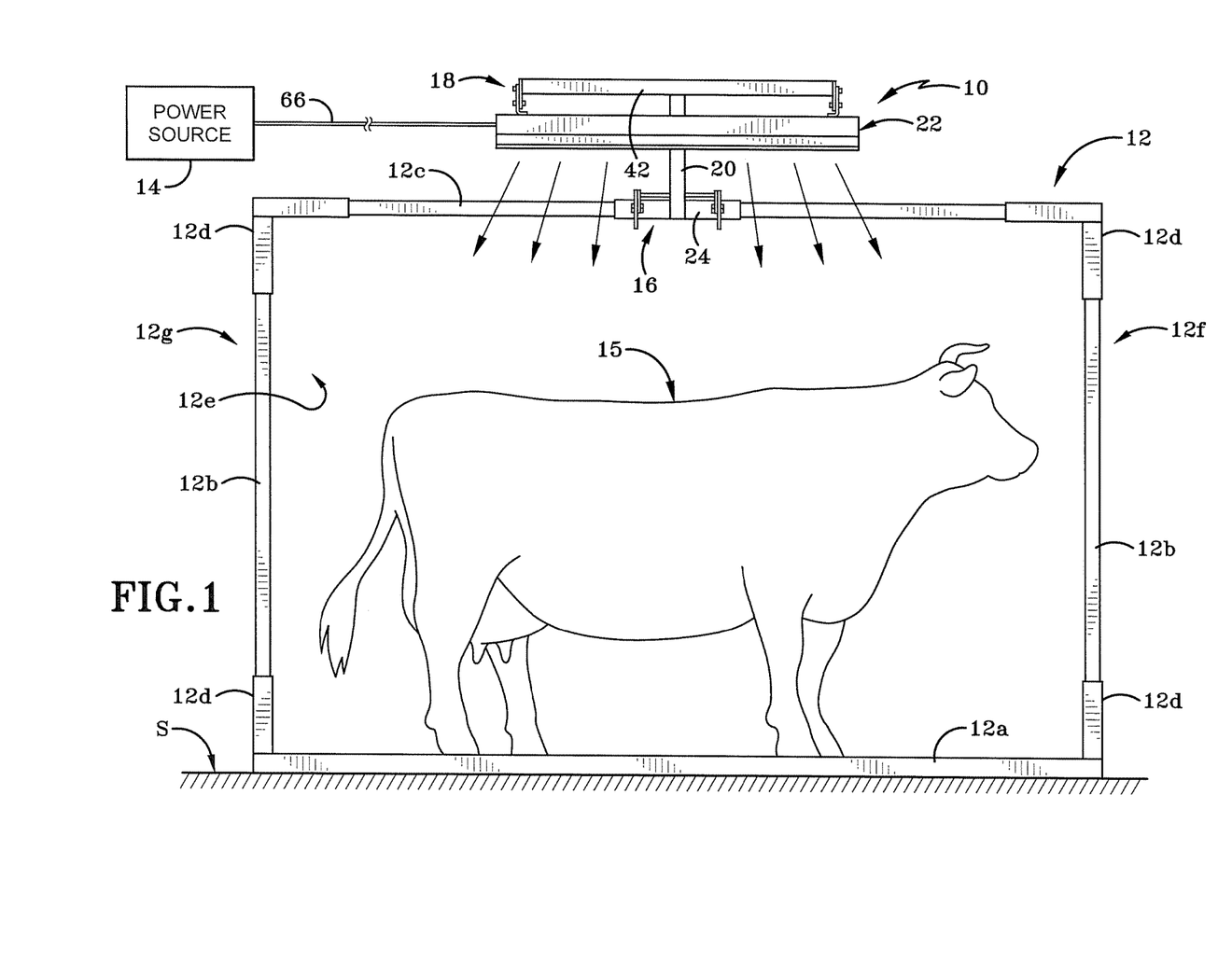
FIG. 1 is an side elevational view of a lamp assembly in accordance with an aspect of the present invention mounted onto a frame of a cattle chute and being utilized to illuminate a cow standing in the cattle chute.
Figure 2:
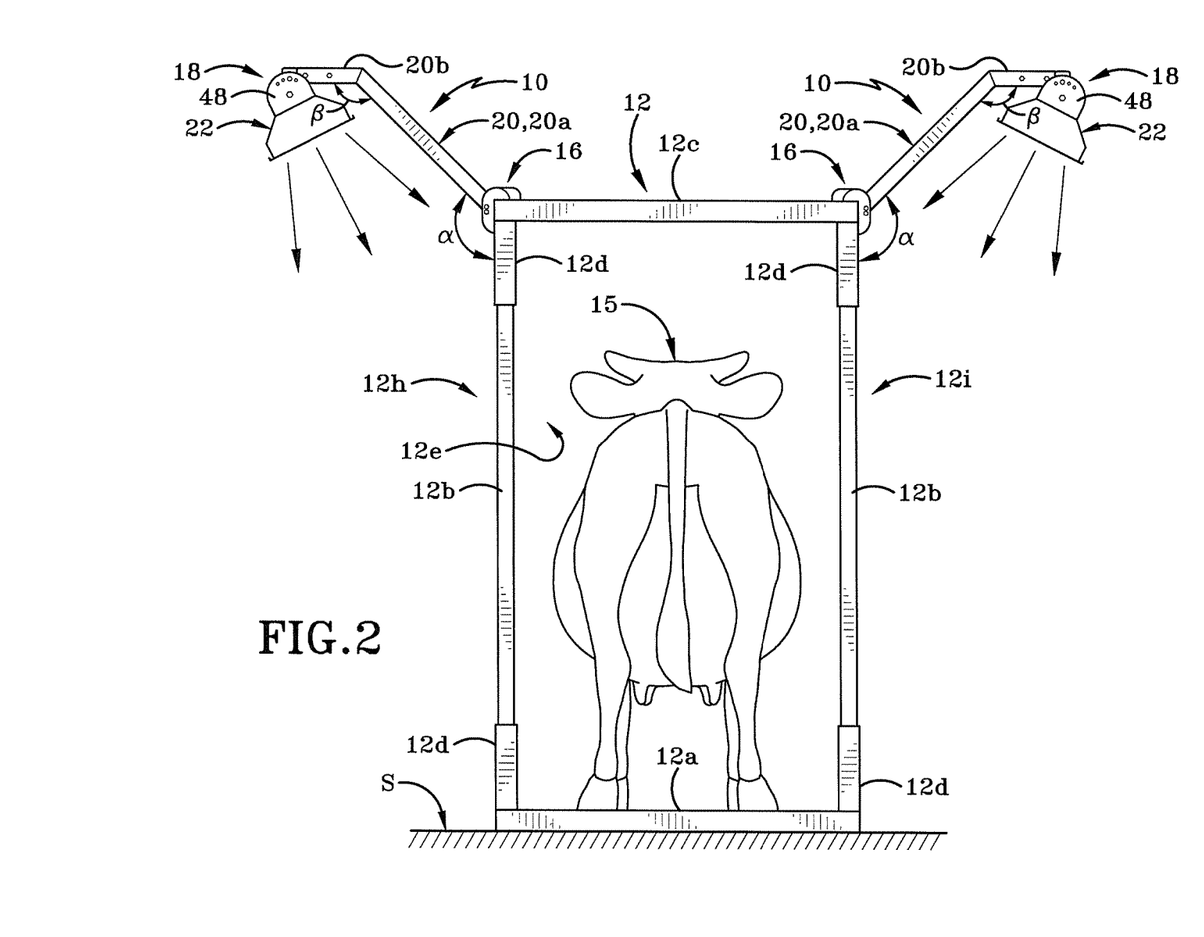
FIG. 2 is a rear elevational view of the lamp assembly mounted on the cattle chute, with the lamps of the lamp assembly angled to direct light towards the cow standing in the chute.

Referring to FIGS. 1-7C, a lamp assembly in accordance with the present invention is disclosed, generally indicated at 10. FIGS. 1 and 2 show a pair of lamp assemblies 10 mounted on a cattle chute 12 and being used to direct light toward a cow 15. Cattle chute 12 is illustrated resting on a surface "S" and is comprised of a floor 12a, side frame members 12b and upper frame members 12c. Connector brackets 12d are illustrated as connecting side frame members 12b and upper frame members 12c together. The floor and frame members 12a-12c bound and define a space 12e within which the cow 15 is received. Each lamp assembly 10 is illustrated as being engaged on one of the upper frame members 12c that extends from a front end 12f to a back end 12g of cattle chute 12 but it will be understood that lamp assembly 10 may be engaged on one of the upper frame members 12c that extends from a first side 12h (FIG. 2) to a second side 12i of cattle chute 12 or on any of the side frame members 12b, if desired. Lamp assembly 10 is operatively engaged with a remote power source 14.

Figure 3:
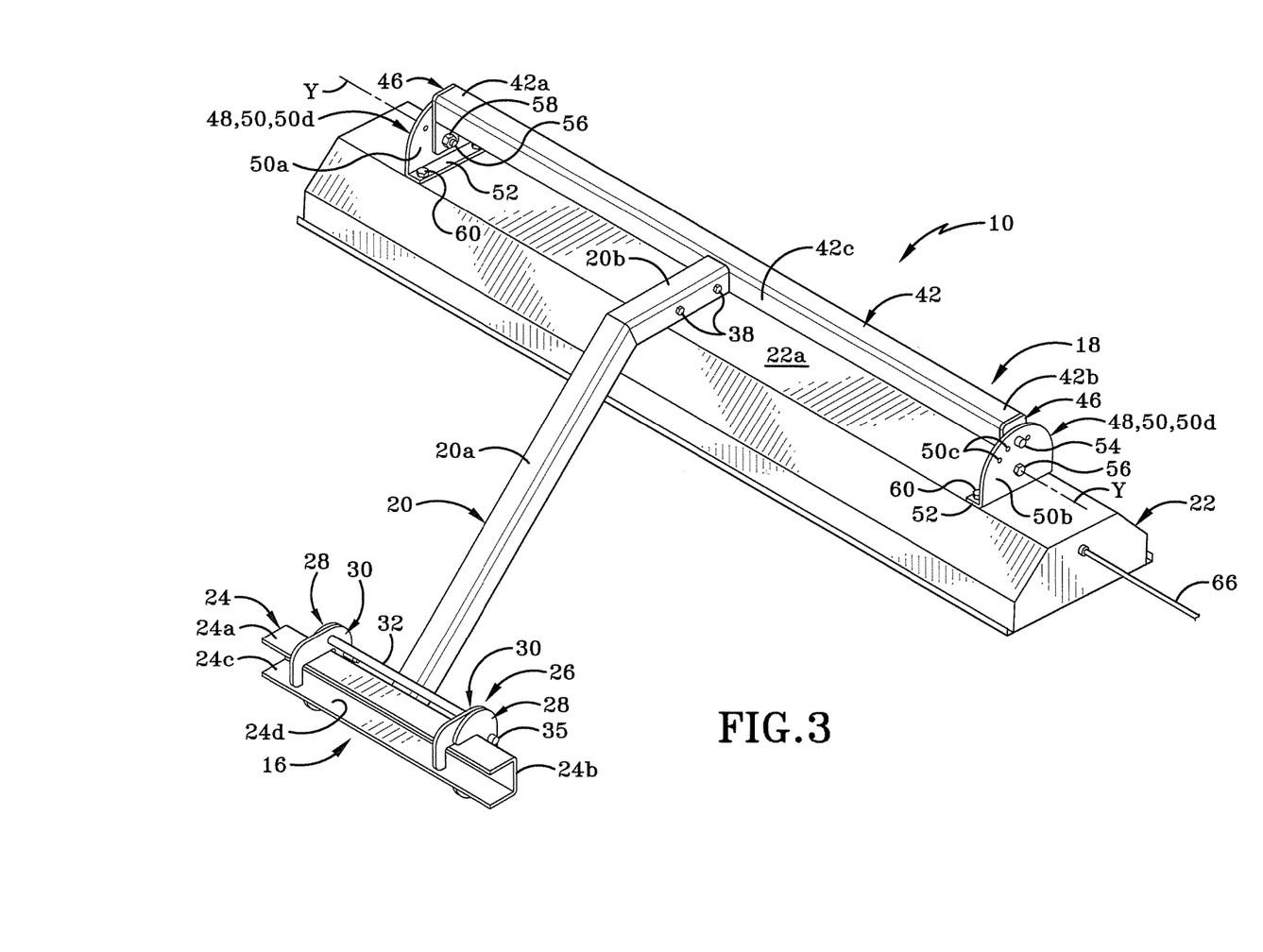
FIG. 3 is an isometric perspective view of the lamp assembly in accordance with an aspect of the present invention.

As depicted in FIGS. 2 and 3, lamp assembly 10 comprises a mounting assembly 16, a support assembly 18 and a lamp 22. Mounting assembly 16 is configured to engage lamp assembly 10 onto a support. In particular, mounting assembly is configured to engage lamp assembly onto a frame member 12c of cattle chute 12. Support assembly 18 is provided to engage lamp 22 and is adjustable, thereby providing a way for the orientation of lamp 22 to be selectively changed. A support arm 20 extends between mounting assembly 16 and support assembly 18. Support arm 20 connects mounting assembly 16 and support assembly 18 together and maintains the assemblies 16, 18 a set distance apart from each other. These various components will be described in greater detail below.

Figure 4A:
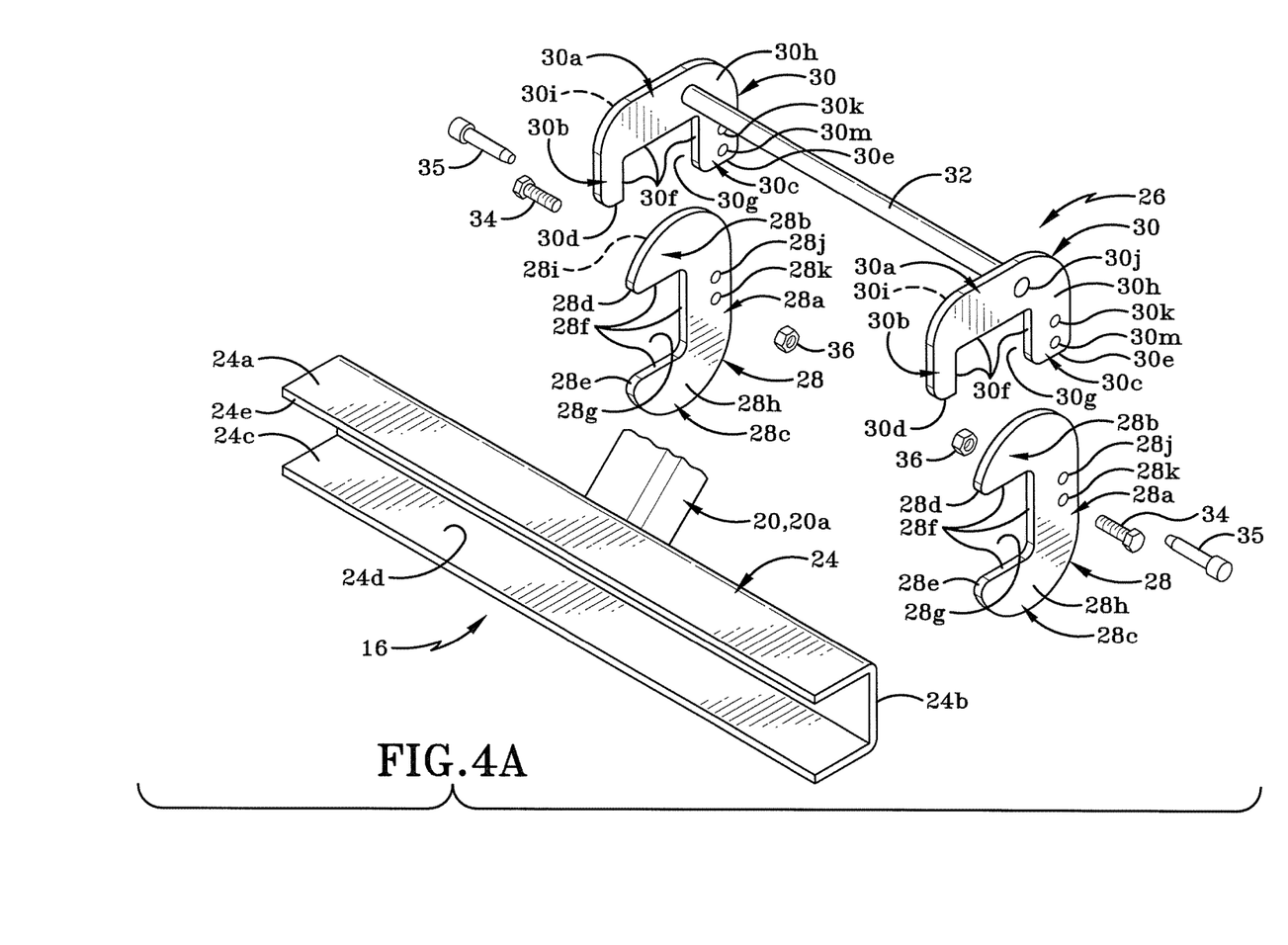
FIG. 4A is an isometric perspective view of a mounting assembly that engages the lamp assembly to the frame of the cattle chute.

As shown in FIGS. 3, 4A and 7A-7C, mounting assembly 16 comprises a channel member 24 and a locking mechanism 26 (FIG. 4A). One or more lock tabs 26 may connect channel member 24 and locking mechanism 26 together. Channel member 24 may be selectively engaged with a support, such as upper frame member 12c or a side frame member 12f of cattle chute 12. Locking mechanism 26 is selectively movable between a locked position and an unlocked position. In particular, locking mechanism 26 may be rotated or pivoted between the locked position and the unlocked position.

Figure 7A:
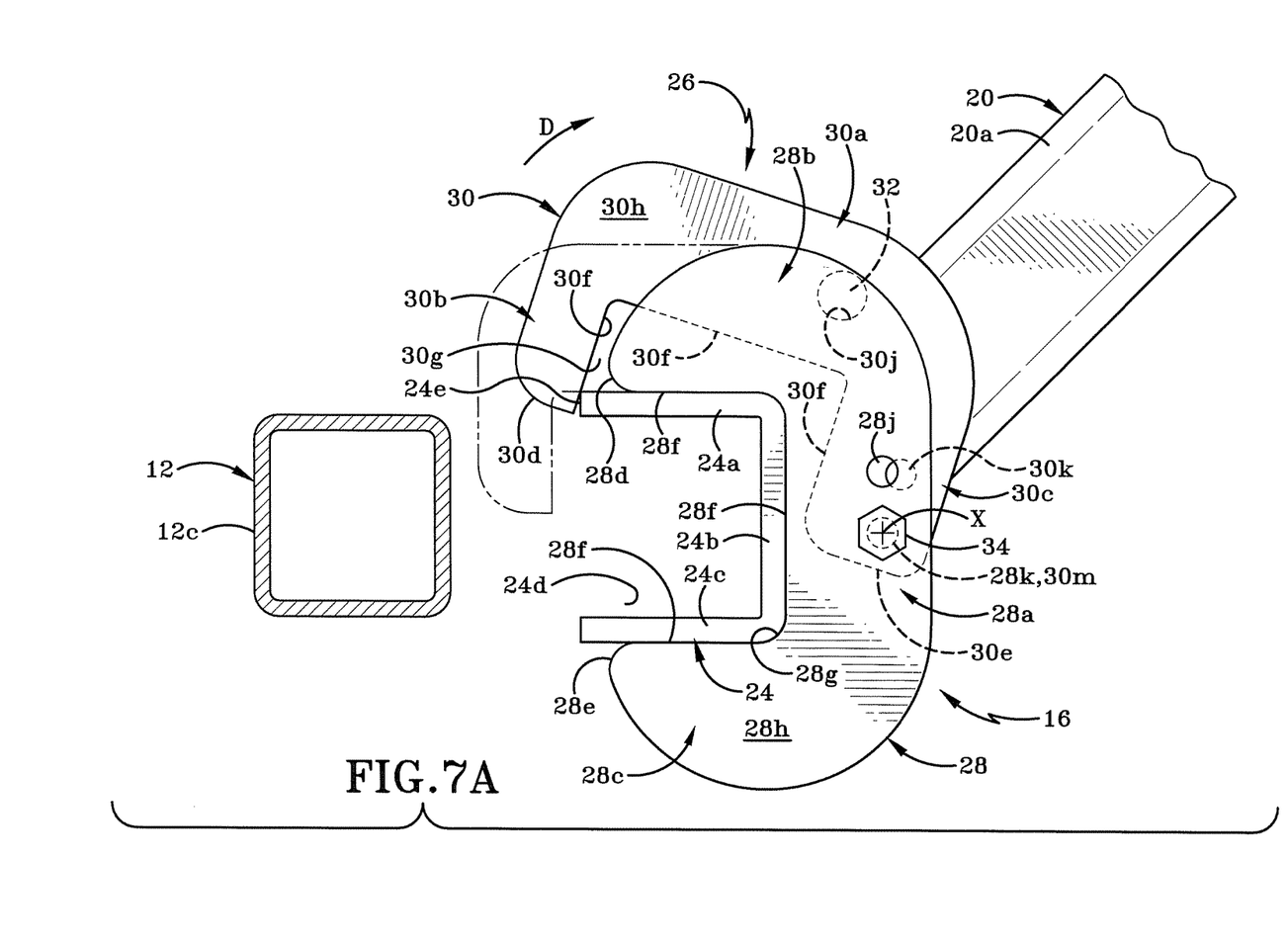
FIG. 7A is a side elevation view of the mounting assembly exploded away from a frame member of the cattle chute and showing the adjustability of the mounting assembly.
Figure 7B:
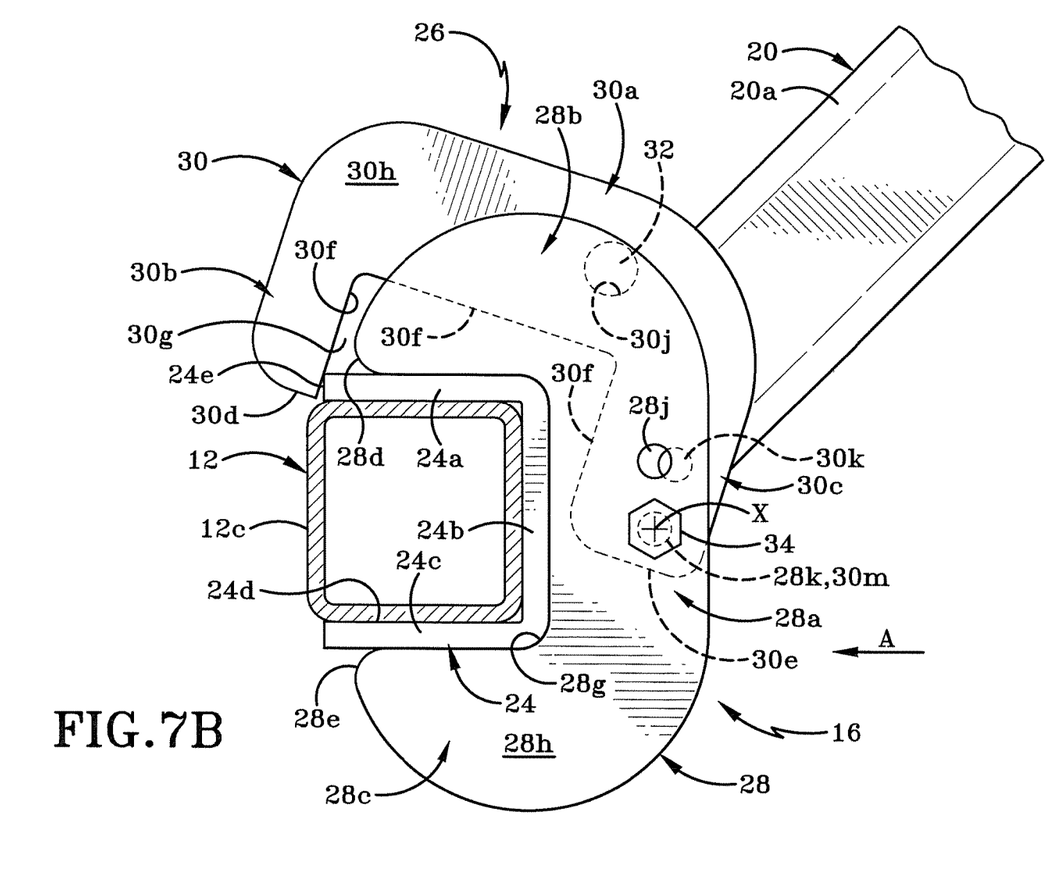
FIG. 7B is a side elevation view of the mounting assembly engaged with the frame member of the cattle chute.
Figure 7C:
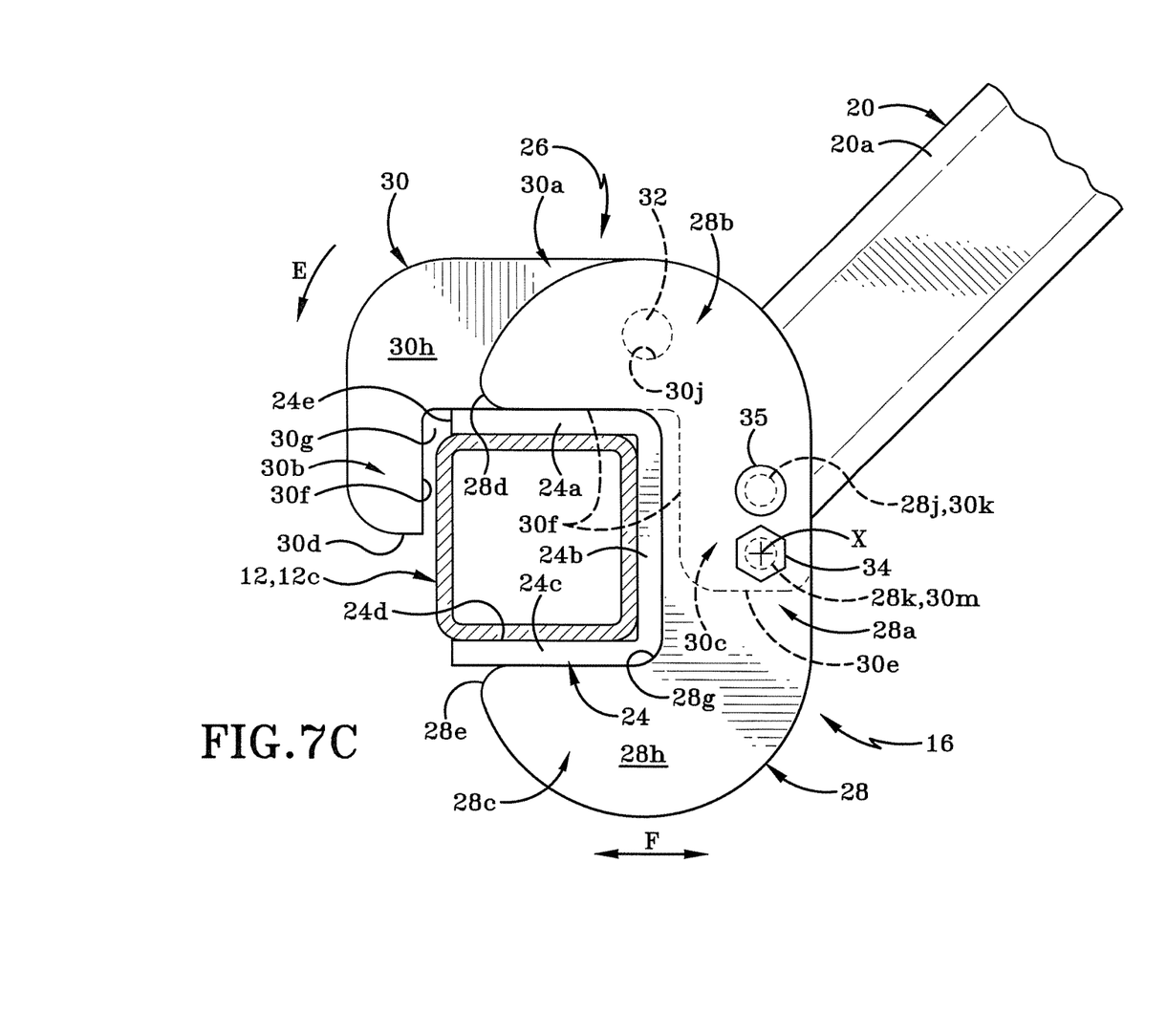
FIG. 7C is a side elevation view of the mounting assembly locked onto the frame member.

Channel member 24 may be generally U-shaped and comprise a top wall 24a, a side wall 24b, and a bottom wall 24c that bound and define a space 24d thereinbetween. Space 24d may be accessible through an opening defined between an end 24e of top wall 24a and an end 24f of bottom wall 24c. Channel member 24 may be configured to be complementary to an exterior surface of a portion of one of the frame members 12c (or 12b) of cattle chute 12. Channel member 24 may be configured receive frame member 12c through the opening between ends 24e, 24f and into space 24d, as is illustrated in FIGS. 7A-7C. When channel member 24 is engaged with upper frame member 12c, the surfaces of a top, bottom and one of the side walls of frame member 12c contact an inner surface of a respective one of the top wall 24a, side wall 24b and bottom wall 24c of channel member 24. When mounting assembly 16 is engaged with upper frame member 12c, the U-shaped channel member 24 is moved toward upper frame member 12c in the direction of arrow "A" (FIG. 7B) such that upper frame member 12c slides into space 12d. Channel member 24 is retained on upper frame member 12c by locking mechanism 26 as will be described further herein.

Each lock tab 28 may comprise a planar member that may be C-shaped having a central region 28a with a first leg 28b extending outwardly from a first end of central region 28a and a second leg 28c extending outwardly from a second end of central region 28a. First leg 28b terminates in a first tip 28d and second leg 28c terminates in a second tip 28e. First leg 28b, central region 28a and second leg 28c define an inner surface 28f that bounds and defines a recess 28g. The shape and size of recess 28g defines by inner surface 28f is complementary to the exterior surface of at least a part of top wall 24a, side wall 24b and bottom wall 24c of channel member 24. As illustrated in FIG. 7B, channel member 24 is receivable within recess 28g of each lock tab 28. Tabs 28 are fixedly secured, such as by welding to the exterior surface of channel member 24. Tabs 28 are located a distance laterally from each other. As shown in FIG. 4A, each lock tab 28 also has a first surface 28h and a second surface 28i and a pair of spaced apart apertures 28j, 28k is defined in lock tab 28. Each aperture 28j, 28k extends from first surface 28h through to second surface 28i.

FIG. 4A shows that locking mechanism 26 comprises a pair of brackets 30 and a connector rod 32. Brackets 30 may be generally C-shaped planar members that each have a central region 30a, a first leg 30b and a second leg 30c. First leg 30b extends outwardly from a first end of central region 30a and second leg 30c extends outwardly from a second end of central region 30a. Second leg 30c may be of a greater width than first leg 30b. First leg 30b terminates in a tip 30d and second leg terminates in a tip 30e. First leg 30b, central region 30a and second leg 30c have inner surfaces 30f that bound and define an opening 30g. Each bracket 30 has a first surface 30h and a second surface 30i. A first hole 30j, second hole 30k and third hole 30m extend between first and second surfaces 30h, 30i. Each end of connector rod 32 is received in the first hole 30j of one of the pair of brackets 30. Connector rod 32 joins the two brackets 30 together and thus the entire locking mechanism 26 is able to move as a unit. It will be understood that the ends of connector rod 32 may be secured by friction in the first holes 30j or an adhesive may be applied to secure connector rod 32 to brackets 30. Still further, the ends of connector rod 32 may be received in first holes 30j and welded to brackets 30. In other embodiments, first holes 30j may be omitted and the ends of connector rod 32 may simply be welded directly to the first surface 30h or second surface 30i of the associated bracket 30. As is evident from FIG. 7A through 7C, opening 30g is of a shape and size that is suitable to receive channel member 24 therein.

Locking mechanism 26 is engaged with bracket 24 and tabs 28 in such a way that brackets 30 are positioned adjacent the inner surfaces of tabs 28 as is illustrated in FIG.

3. (Both brackets 30 and connector rod 32 are thus positioned between the inner surfaces of the two tabs 28.) A fastener 34 is received through hole 28k of each tab 28 and into third hole 30m of one of bracket 30 in order to secure tabs 28 to locking mechanism 26. A nut 36 locks each fastener 34 in place. Brackets 30 are able to pivot relative to tabs 28 about an axis "X" (FIG. 7A) that extends along the shafts of fasteners 34 between a first position shown in FIG. 7A and a second position shown in FIG. 7C. This will be further described herein.

A locking pin 35 (FIGS. 3 and 4A) is removed from aligned holes 28j, 30k of lock tabs 28 and brackets 30, respectively, in order to allow locking mechanism 26 to pivot relative to lock tabs 28 and thereby relative to channel member 24. Once locking pin 35 is removed, locking mechanism 26 may be moved to an unlocked position. Frame member 12c may then be inserted into channel 24d or removed therefrom. Locking mechanism 26 is then rotated once again to the locked position and locking pin 35 is inserted through aligned holes 28j, 30k in order to secure brackets 30 of locking mechanism 26 to lock tabs 28 in the locked position.

Support arm 20 may comprise a first section 20a and a second section 20b. First and second sections 20a, 20b may be generally square in cross-sectional shape and be hollow in the center. First section 20a may be of a greater length than second section 20b. A first end of first section 20a may be fixedly secured, such as by welding, to bracket 24. In particular, the first end of first section 20a may be welded to side wall 24b of bracket 24. First section 20a may be oriented at an angle α (FIG. 2) relative to side wall 24b. Angle α may be from about 40° up to about 50°, and particularly may be about 45°.

A first end of second section 20b of support arm 20 may be fixedly secured, such as by welding, to a second end of first section 20a. First and second sections 20a, 20b may be oriented at an angle β (FIG. 2) relative to each other. Angle β may be from about 130° up to about 140°, and particularly may be about 135β

Second section 20b defines a pair of laterally spaced apart apertures 20c, therein. Apertures 20c are defined in each of the opposed side walls of second section 20b. As will be later described herein, a fastener 38 may be received through each aperture 20c and be secured to second section 20b by a nut 40.

Figure 4B:
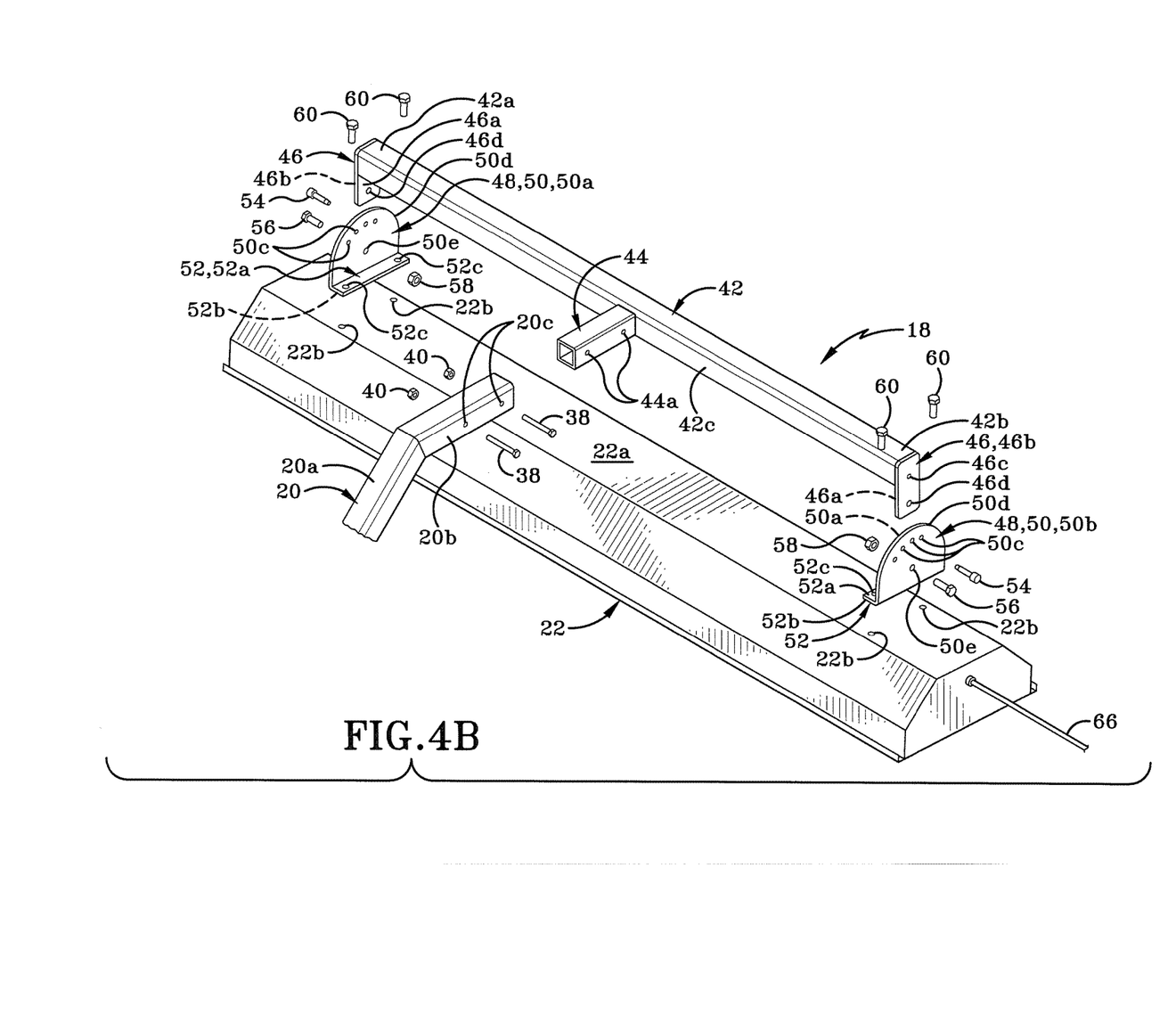
FIG. 4B is an isometric perspective view of a top cross assembly and the lamp.

Support assembly 18 is shown in greater detail in FIG. 4B. Support assembly 18 comprises a cross-piece 42, an insert 44, a pair of adjustment plates 46, and a pair of lamp brackets 48.

Cross-piece 42 may be fabricated from the same material as support arm 20 and therefore be generally square in cross-section and hollow. Cross-piece 42 has a first end 42a and a second end 42b. A rear wall 42c extends between first and second ends and insert 44 is fixedly secured in any suitable manner, such as by welding, to rear wall 42c. Insert 44 may also be generally square in cross-section and hollow but the dimensions thereof are such that the insert 44 is able to slide into the hollow interior of second section 20b of support arm 20. (In other embodiments, second section 20b may be able to slide into the hollow interior of insert 44.) Insert 44 defines a pair of laterally spaced holes 44a therein. The holes 44a are defined in each of the opposed side walls of insert 44. The spacing between holes 44a corresponds to the spacing between holes 20c in second section 20b of support arm 20. Insert 44 may be inserted into the hollow interior of second section 20 of support arm 20 and be moved inwardly until holes 44a and 20c are brought into alignment with each other. Fasteners 38 are then inserted through the aligned holes 44a, 20c and nuts 40 secure fasteners 38 in place. Thus, fasteners 38 and nuts 40 secure second section 20b and insert 44 together and support arm assembly 18 is thereby secured to support arm 20.

Adjustment plates 46 are fixedly secured in any suitable manner, such as by welding, to each of the first end 42a and second end 42b of cross-piece 42. Each adjustment plate 46 is a planar member having a first side surface 46a (FIG. 6) and a second side surface 46b. A pair of vertically spaced apart apertures 46c, 46d is defined in adjustment plate 46. Apertures 46c, 46d extend between a first side surface and a second side surface of the associated adjustment plate 46.

Figure 5:
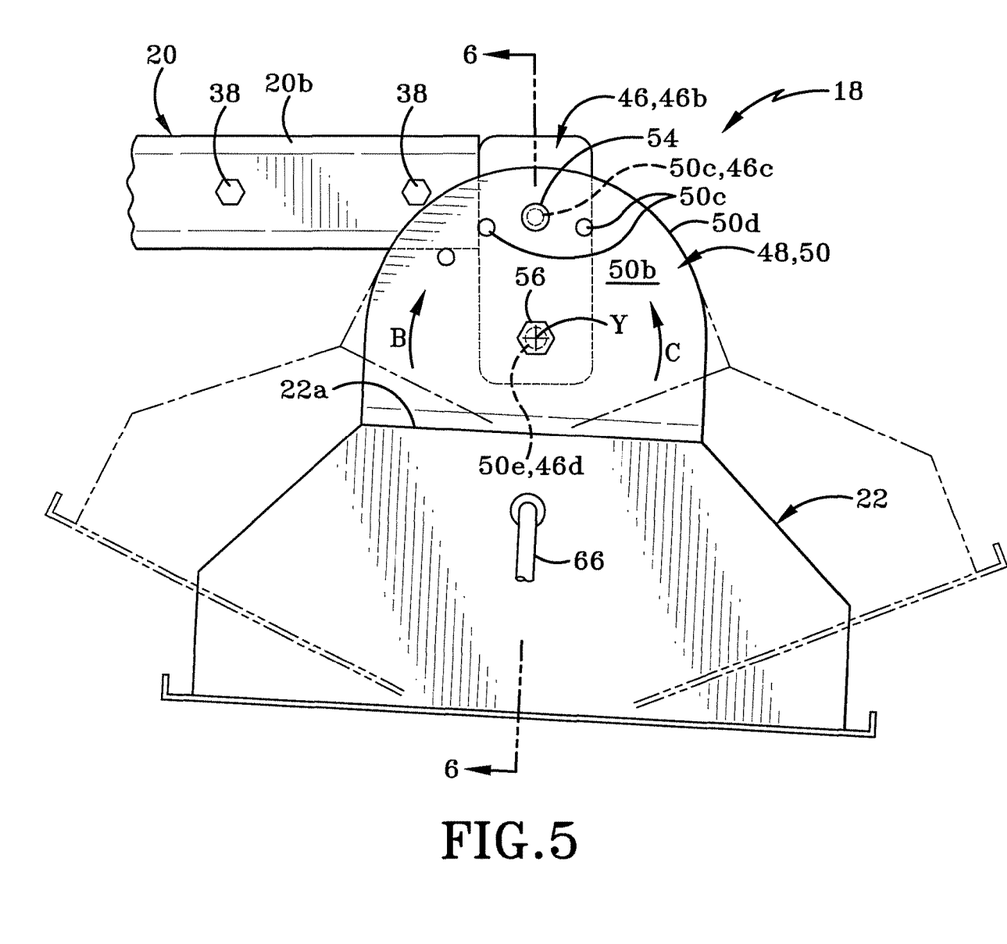
FIG. 5 is a rear elevation view of the top cross assembly and the lamp showing how the lamp is pivotable relative to the top cross assembly.
Figure 6:
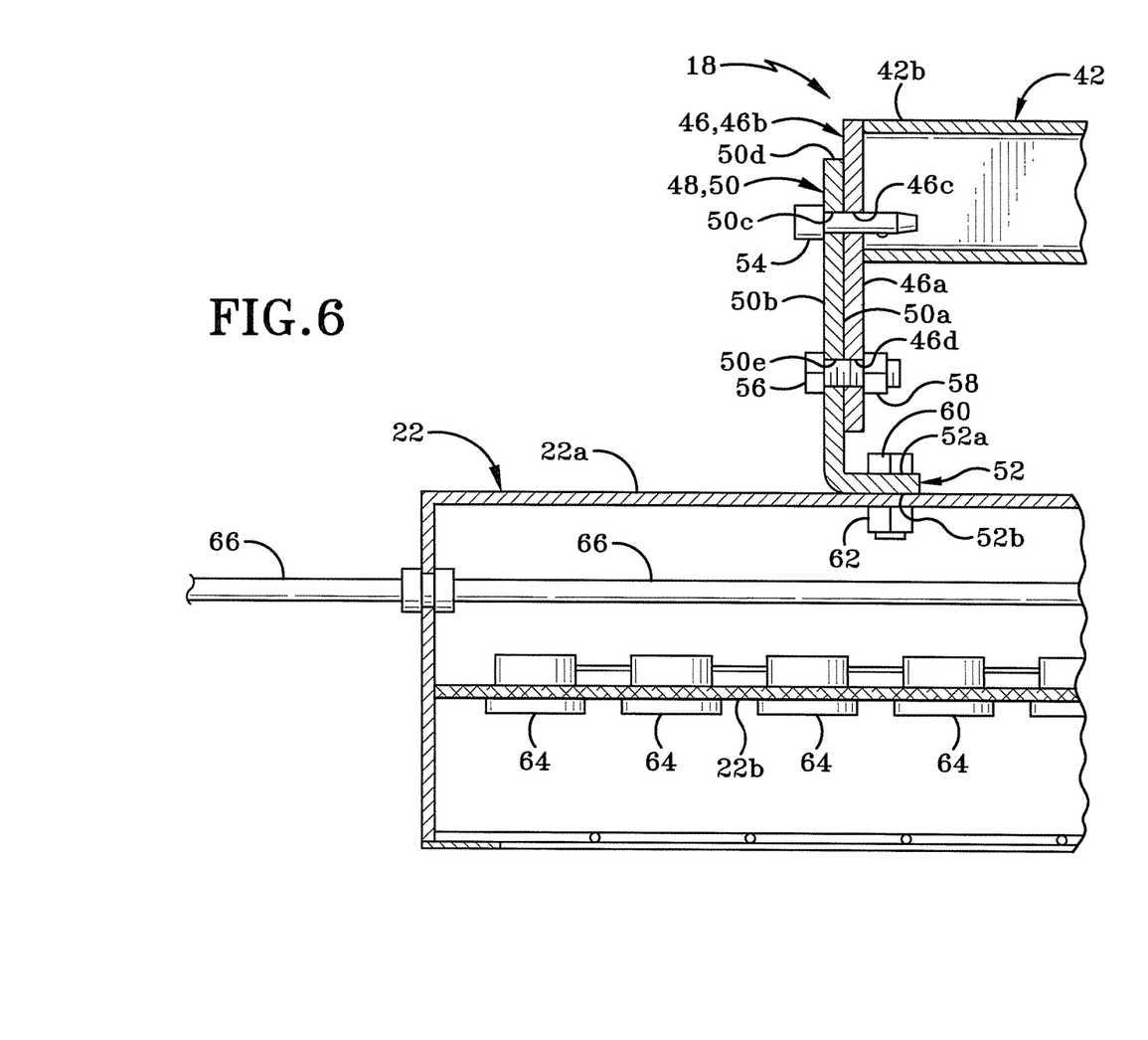
FIG. 6 is a cross-section of the top cross assembly and the lamp taken along line 6-6 of FIG. 5.

Lamp brackets 48 are substantially L-shaped as may be seen in FIG. 6 and include a first member 50 and a second member 52. First member 50 may be a planar member that may be generally semi-circular in shape when viewed from the side (such as in FIG. 3). First member 50 may have opposed first and second surfaces 50a, 50b (FIG. 6) and a plurality of first openings 50c may be defined in first member 50, extending between the first and second surfaces 50a, 50b thereof. As best seen in FIG. 5, first openings 50c may be arranged in an arcuate configuration or pattern that generally follows the contours of an upper surface 50d of first member 50. First member 50 is secured to adjustment plate 46 by a fastener 54 (FIG. 6) that is inserted through a selected one of the first openings 50c in first member 50 and aperture 46c of adjustment plate 46. The particular one of the first openings 50c that is selected is determined by the particular angle at which a user may wish to oriented lamp 22. This will be discussed later herein. It should be noted that the type of fastener 54 utilized to secure first member 50 and adjustment plate 46 together may be of a type that does not require a nut to hold it in plate. The fastener 54 may be quickly and easily withdrawn from first opening 56 and aperture 46c to adjust the angle of tilt of lamp 22 and then be reinserted through a different one of first openings 56 and aperture 46c. In some instance, a connector wire (not shown) may be provided on first member 50 and be secured to fastener 54 to ensure that the fastener 54 is not easily dropped and lost during adjustment of lamp 22.

Each first member 50 also defines a second opening 50e (FIG. 4B) therein. Second opening 50 extends between first and second side surfaces 50a, 50b of first member. A fastener 56 may be utilized to secure each first member 50 to one of the adjustment plates 46 and thereby to cross-piece 42. Fastener 56 may be inserted through second opening 50e and into aperture 46d in adjustment plate 46 and a nut 58 may be utilized to lock fastener 56 in place. During adjustment of the orientation of lamp 22, lamp 22 may pivot about an axis "Y" (FIG. 3) extending along the shafts of fasteners 56. As is illustrated in FIG. 5, lamp 22 may be pivoted in either of a first direction "B" or a second direction "C" about axis "Y".

FIG. 6 shows that second member 52 may have an upper surface 52a and a lower surface 52b. FIG. 4B shows that a plurality of holes 52c are defined in second member, where each hole 52c extends between upper and lower surfaces 52a, 52b. When each light bracket 48 is to be secured to lamp 22, second member 52 of light bracket is placed in abutting contact with an upper wall 22a of lamp 22 and holes 52c are aligned with apertures 22b defined in upper wall 22a. A fastener 60 is inserted through each pair of aligned holes 52c and apertures 22b and a nut 62 is engaged therewith to secure fastener 60 in place and thereby secure lamp 22 to light bracket 48. Lamp 22 is thus suspended from lamp brackets 48 that are engaged with cross-piece 42.

FIG. 6 shows that the lamp 22 includes a mounting plate 22b into which a plurality of LED's 64 (Light Emitting Diodes) are mounted. LEDs 64 are operatively engaged, via wiring 66, to remote power source 14 (FIG. 1). While it is preferred to have the light source in lamp 22 in the form of LEDs 64, it will be understood that any other type of light bulb may be provided in lamp 22 such as a fluorescent light bulb. Lamp 22 itself may be of any desired type or configuration.

Lamp assembly 10 may be quickly and easily engaged with or disengaged from cattle chute 12. As shown in FIGS. 7A to 7B, in order to engage lamp assembly 10 with cattle chute 12, locking mechanism 26 is moved from a locked position (FIG. 7A) to an unlocked position (FIG. 7B) by pivoting locking mechanism 26 in a first direction indicated by arrow "D" about axis "X". Channel member 24 of mounting assembly 16 is then moved into close proximity with upper frame member 12c of cattle chute 12. Bracket 24 is oriented such that upper frame member 12c is received in space 24d defined by bracket 24 when bracket 24 is moved in the direction of arrow "A" (FIG. 7B). The tips 30d of first leg 30b of brackets 30 contact the upper end 24e of upper wall 24a of channel member 24. This latches locking mechanism 26 to channel member 24 and prevents locking mechanism 26 from accidentally disengaging from channel member 24.

Locking mechanism 26 is then moved to a locked position to secure mounting assembly 16 to upper frame member 12c. This is accomplished by the user grasping connector rod 32 and moving it in the direction of arrow "E" (FIG. 7C). First legs 30b of the two brackets 30 move downwardly and in front of the side wall 12j (FIG. 7C) of upper frame member 12c. In this locked position, brackets 30 substantially prevent lateral movement of the bracket 24 in the directions indicated by arrow "F". At this point, mounting assembly 16 is locked to upper frame member 12c of cattle chute 12.

The user may adjust the orientation of lamp 22 in any manner desired by withdrawing the two fasteners 54 from the first members 50 of lamp brackets 48 and then pivoting the lamp 22 about axis "Y" in either of the directions "B" or "C" (FIG. 5). Lamp 22 is pivoted in order to move a different one of the holes 50c into alignment with the hole 46c in adjustment plate 46c. Once the desired position is attained, fasteners 54 are reinserted through the aligned holes 50c, 46c and lamp 22 is thereby retained in the new orientation.

Lamp 22 may then be switched on to cause LEDs 64 to shine light towards cow 15 located within chute 12. When the user is finished inspecting cow 15 or treating or milking the cow 15, lamp 22 may be switched off. If desired, lamp assembly 10 may be disengaged from the illustrated location on chute 12 and moved elsewhere or be stored. In order to disengage lamp assembly 10, the user will grasp connector rod 32 and pivot tap mounting assembly 26 in the opposite direction to arrow "E" (FIG. 7C). This will move first legs 30b of brackets 30 back into the position shown in FIG. 7B. The connector rod 32 may be pivoted even further in the direction of arrow "E" to cause the tips 30d of first legs 30b of bracket 30 to be moved out of contact with end 24e of channel member 24. Mounting assembly 16 may then be moved in the opposite direction to arrow "A" (FIG. 7B) and out of engagement with upper frame member 12c.

It will be understood that second section 20b and insert 44 may include one or more holes 20c, 44a therein so that the horizontal position of lamp 22 may be adjusted.

It will further be understood that first section 20a and second section 20b may be pivotally engaged with each other instead of being welded together to provide for even more adjustability of the position of lamp 22.

It will further be understood that first section 20a and second section may be fabricated in such a way as to be of an adjustable length. For example, the first section 20a and/or second section 20b may be fabricated of multiple telescoping sections.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

Having thus described the invention, we claim:

1. In combination:
    a cattle chute including a first frame member; and
    a lamp assembly that is mountable onto the first frame member; said lamp assembly comprising:
        a mounting assembly that is selectively engageable with the first frame member, the mounting assembly comprising:
            a channel member that defines a channel therein that is complementary to an exterior surface of at least a portion of the first frame member and the portion of the first frame member is receivable in the channel; and
            a locking mechanism operatively engaged with the channel member wherein the locking mechanism includes at least one lock tab and at least one bracket wherein the bracket is pivoted relative to the lock tab between a locked position and an unlocked position;
        a support assembly operatively engaged with the mounting assembly; and
        a lamp engaged with the support assembly; wherein the support assembly is adjustable to vary an angle of the lamp relative to the mounting assembly and thereby to vary an angle light emitted from the lamp into the cattle chute.

2. The combination of claim 1, wherein the mounting assembly is movable between an unlocked position where the first frame member is receivable into the mounting assembly or out of the mounting assembly; and a locked position where the first frame member is secured within the mounting assembly.

3. A method of illuminating an animal in a cattle chute: comprising:
    engaging a first frame member of the cattle chute in a mounting assembly of a lamp assembly;
    inserting the first frame member into a channel of a channel member on the mounting assembly, the mounting assembly including a locking mechanism having at least one lock tab and at least one bracket;
    pivoting said bracket of said locking mechanism relative to said lock tab from an unlocked position to a locked position;
    adjusting an orientation of a lamp on the lamp assembly relative to the mounting assembly; and
    illuminating an animal in an interior of the cattle chute with light emitted by the lamp.

4. The method as defined in claim 3, further comprises:
    moving a leg on the locking mechanism from a first position where the leg does not extend across an opening to the channel to a second position where the leg does extend across the opening to the channel; and preventing removal of the first frame member from the channel with the leg that extends across the opening to the channel.

5. The method as defined in claim 3, wherein the step of adjusting the lamp comprises:

selecting an angle of illumination of the lamp;

pivoting a pair of lamp brackets engaged with the lamp relative to a pair of adjustment plates;

aligning one of a plurality of holes on each of the pair of lamp brackets with an aperture defined in an associated one of the pair of adjustment plates; and inserting a locking pin through each aligned aperture and the one of the plurality of holes.

6. The method as defined in claim 5, further comprising:

adjusting the angle of the lamp relative to the mounting assembly by:

pivoting the pair of lamp brackets relative to the pair of adjustment plates;

aligning a second one of the plurality of holes on each of the pair of lamp brackets with the aperture in the pair of adjustment plates; and inserting each locking pin through the aligned aperture and the second one of the plurality of holes.

7. The method as defined in claim 3, further comprising:

actuating a plurality of LEDs provided on the lamp; and emitting light from the LEDs into the interior of the cattle chute.

\* \* \* \* \*